United States Patent
Nguyen et al.

(10) Patent No.: US 7,493,957 B2
(45) Date of Patent: *Feb. 24, 2009

(54) METHODS FOR CONTROLLING WATER AND SAND PRODUCTION IN SUBTERRANEAN WELLS

(75) Inventors: Philip D. Nguyen, Duncan, OK (US); Leopoldo Sierra, Houston, TX (US); Eldon D. Dalrymple, Duncan, OK (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,028

(22) Filed: Jul. 15, 2005

(65) Prior Publication Data
US 2007/0012445 A1    Jan. 18, 2007

(51) Int. Cl.
*E21B 33/13* (2006.01)
*A47B 43/00* (2006.01)

(52) U.S. Cl. .................. 166/295; 166/279; 166/281; 166/300; 166/308.1

(58) Field of Classification Search ............ None
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,689,244 A | 9/1954 | Jones | |
| 2,819,278 A | 1/1958 | De Groots et al. | |
| 2,843,573 A | 7/1958 | Melamed | |
| 2,863,832 A | 12/1958 | Perrine | |
| 2,877,179 A | 3/1959 | Hughes et al. | |
| 2,910,436 A | 10/1959 | Fatt et al. | |
| 3,008,898 A | 11/1961 | Hughes et al. | |
| 3,052,298 A | 9/1962 | Mallot | |

(Continued)

FOREIGN PATENT DOCUMENTS

DE    2 250 552    4/1974

(Continued)

OTHER PUBLICATIONS

Larry Eoff, E. Dwyann Dalrymple, B.R. Reddy, and Don Everett, "Structure and Process Optimization for the Use of a Polymeric Relative-Permeability Modifier in Conformance Control," SPE Paper, 64985, 2001.

(Continued)

*Primary Examiner*—Zakiya W Bates
*Assistant Examiner*—Angela M DiTrani
(74) *Attorney, Agent, or Firm*—Robert A. Kent; Baker Botts LLP

(57) ABSTRACT

Methods for stabilizing unconsolidated or weakly consolidated portions of a subterranean formation and controlling the production of water in those portions include introducing a consolidating agent into the subterranean formation so as to transform a portion of the subterranean formation surrounding the well bore into a consolidated region; and introducing a relative permeability modifier fluid into the subterranean formation so as to penetrate at least a portion of the consolidated region. Fracturing steps may be used to reconnect the well bore to portions of the formation (e.g., formation reservoirs) in certain embodiments. Optionally, preflush fluids, after-flush fluids, and shutting-in periods may be used as desired.

19 Claims, 2 Drawing Sheets

U.S. PATENT DOCUMENTS

| | | | |
|---|---|---|---|
| 3,065,247 A | 11/1962 | De Groots et al. | |
| 3,070,165 A * | 12/1962 | Stratton | 166/283 |
| 3,215,199 A | 11/1965 | Dilgren | |
| 3,251,415 A | 5/1966 | Bombardieri et al. | |
| 3,251,778 A | 5/1966 | Dickson et al. | |
| 3,258,428 A | 6/1966 | Dickson et al. | |
| 3,265,512 A | 8/1966 | Dickson et al. | |
| 3,271,307 A | 9/1966 | Dickson et al. | |
| 3,297,090 A | 1/1967 | Dilgren | |
| 3,307,630 A | 3/1967 | Dilgren et al. | |
| 3,326,890 A | 6/1967 | Engelskirchen et al. | |
| 3,336,980 A | 8/1967 | Rike | |
| 3,347,789 A | 10/1967 | Dilgren et al. | |
| 3,382,924 A | 5/1968 | Veley et al. | |
| 3,404,114 A | 10/1968 | Snyder et al. | |
| 3,434,971 A | 3/1969 | Atkins | |
| 3,441,085 A | 4/1969 | Gidley | |
| 3,451,818 A | 6/1969 | Wareham | |
| 3,489,222 A | 1/1970 | Millhone et al. | |
| 3,601,194 A | 8/1971 | Gallus | |
| 3,647,507 A | 3/1972 | Ashcraft | |
| 3,647,567 A | 3/1972 | Schweri | |
| 3,689,418 A | 9/1972 | Cenci et al. | |
| 3,689,468 A | 9/1972 | Cenci et al. | |
| 3,708,013 A | 1/1973 | Dismukes | |
| 3,709,298 A | 1/1973 | Pramann | |
| 3,744,566 A | 7/1973 | Szabo et al. | |
| 3,902,557 A | 9/1975 | Shaughnessy et al. | |
| 3,910,862 A | 10/1975 | Barabas et al. | |
| 3,943,060 A | 3/1976 | Martin et al. | |
| 3,983,941 A | 10/1976 | Fitch | |
| 4,052,343 A | 10/1977 | Cunningham | |
| 4,052,345 A | 10/1977 | Austin et al. | |
| 4,129,183 A | 12/1978 | Kalfoglou | |
| 4,129,534 A | 12/1978 | Cunningham | |
| 4,142,595 A | 3/1979 | Anderson et al. | |
| 4,152,274 A | 5/1979 | Phillips et al. | |
| 4,158,521 A | 6/1979 | Anderson et al. | |
| 4,158,726 A | 6/1979 | Kamada et al. | |
| 4,228,277 A | 10/1980 | Landoll | |
| 4,299,710 A | 11/1981 | Dupre et al. | |
| 4,306,981 A | 12/1981 | Blair, Jr. | |
| 4,337,828 A | 7/1982 | Blair, Jr. | |
| 4,366,071 A | 12/1982 | McLaughlin et al. | |
| 4,366,072 A | 12/1982 | McLaughlin et al. | |
| 4,366,073 A | 12/1982 | McLaughlin et al. | |
| 4,366,074 A | 12/1982 | McLaughlin et al. | |
| 4,374,739 A | 2/1983 | McLaughlin et al. | |
| 4,393,939 A | 7/1983 | Smith et al. | |
| 4,395,340 A | 7/1983 | McLaughlin | |
| 4,401,789 A | 8/1983 | Gideon | |
| 4,439,334 A | 3/1984 | Borchardt | |
| 4,440,649 A | 4/1984 | Loftin et al. | |
| 4,441,556 A | 4/1984 | Powers et al. | |
| 4,447,342 A | 5/1984 | Borchardt et al. | |
| 4,460,627 A | 7/1984 | Weaver et al. | |
| 4,462,718 A | 7/1984 | McLaughlin et al. | |
| 4,499,214 A | 2/1985 | Sortwell | |
| 4,532,052 A | 7/1985 | Weaver et al. | |
| 4,536,297 A | 8/1985 | Loftin et al. | |
| 4,536,303 A | 8/1985 | Borchardt | |
| 4,536,305 A | 8/1985 | Borchardt et al. | |
| 4,552,670 A | 11/1985 | Lipowski et al. | |
| 4,554,081 A | 11/1985 | Borchardt et al. | |
| 4,563,292 A | 1/1986 | Borchardt | |
| 4,604,216 A | 8/1986 | Irvin et al. | |
| 4,608,139 A | 8/1986 | Craun et al. | |
| 4,619,776 A | 10/1986 | Mondshine | |
| 4,627,926 A | 12/1986 | Peiffer et al. | |
| 4,662,448 A | 5/1987 | Ashford et al. | |
| 4,671,883 A | 6/1987 | Connell et al. | |
| 4,693,639 A | 9/1987 | Hollenbeak et al. | |
| 4,699,722 A | 10/1987 | Dymond et al. | |
| 4,702,319 A | 10/1987 | Bock et al. | |
| 4,730,028 A | 3/1988 | Bock et al. | |
| 4,814,096 A | 3/1989 | Evani | |
| 4,828,725 A | 5/1989 | Lai et al. | |
| 4,828,726 A | 5/1989 | Himes et al. | |
| 4,856,590 A | 8/1989 | Caillier | |
| 4,870,167 A | 9/1989 | Zody et al. | |
| 4,941,537 A | 7/1990 | Langemeier et al. | |
| 4,956,104 A | 9/1990 | Cowan et al. | |
| 4,959,432 A | 9/1990 | Fan et al. | |
| 4,960,876 A | 10/1990 | Molteni et al. | |
| 5,051,197 A | 9/1991 | Kalfayan et al. | |
| 5,071,934 A | 12/1991 | Peiffer | |
| 5,097,904 A | 3/1992 | Himes | |
| 5,105,886 A | 4/1992 | Strubhar et al. | |
| 5,146,986 A | 9/1992 | Dalrymple | |
| 5,160,642 A | 11/1992 | Schield et al. | |
| 5,197,544 A | 3/1993 | Himes | |
| 5,208,216 A | 5/1993 | Williamson et al. | |
| 5,244,042 A | 9/1993 | Dovan et al. | |
| 5,248,665 A | 9/1993 | Hale et al. | |
| 5,256,651 A | 10/1993 | Phelps et al. | |
| 5,271,466 A | 12/1993 | Harms | |
| 5,342,530 A | 8/1994 | Aften et al. | |
| 5,379,841 A | 1/1995 | Pusch et al. | |
| 5,382,371 A | 1/1995 | Stahl et al. | |
| 5,424,284 A | 6/1995 | Patel et al. | |
| 5,445,223 A | 8/1995 | Nelson et al. | |
| 5,473,059 A | 12/1995 | Yeh | |
| 5,597,783 A | 1/1997 | Audibert et al. | |
| 5,607,902 A | 3/1997 | Smith et al. | |
| 5,637,556 A | 6/1997 | Argillier et al. | |
| 5,643,460 A | 7/1997 | Marble et al. | |
| 5,646,093 A | 7/1997 | Dino | |
| 5,669,456 A | 9/1997 | Audibert et al. | |
| 5,681,796 A | 10/1997 | Nimerick | |
| 5,704,426 A | 1/1998 | Rytlewski et al. | |
| 5,720,347 A | 2/1998 | Audibert et al. | |
| 5,728,653 A | 3/1998 | Audibert et al. | |
| 5,735,349 A | 4/1998 | Dawson et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,887,653 A | 3/1999 | Bishop et al. | |
| 5,908,814 A | 6/1999 | Patel et al. | |
| 5,944,106 A | 8/1999 | Dalrymple et al. | |
| 5,972,848 A | 10/1999 | Audibert et al. | |
| 5,979,557 A | 11/1999 | Card et al. | |
| 5,990,052 A | 11/1999 | Harris | |
| 6,020,289 A | 2/2000 | Dymond | |
| 6,070,664 A | 6/2000 | Dalrymple et al. | |
| 6,124,245 A | 9/2000 | Patel | |
| 6,187,839 B1 | 2/2001 | Eoff et al. | |
| 6,194,356 B1 | 2/2001 | Jones et al. | |
| 6,209,646 B1 | 4/2001 | Reddy et al. | |
| 6,228,812 B1 | 5/2001 | Dawson et al. | |
| 6,237,687 B1 | 5/2001 | Barbee, Jr. et al. | |
| 6,242,390 B1 | 6/2001 | Mitchell et al. | |
| 6,253,851 B1 | 7/2001 | Schroeder, Jr. et al. | |
| 6,277,900 B1 | 8/2001 | Oswald et al. | |
| 6,281,172 B1 | 8/2001 | Warren et al. | |
| 6,283,210 B1 | 9/2001 | Soliman et al. | |
| 6,291,404 B2 | 9/2001 | House | |
| 6,311,773 B1 | 11/2001 | Todd et al. | |
| 6,358,889 B2 | 3/2002 | Waggenspack et al. | |
| 6,359,047 B1 | 3/2002 | Thieu et al. | |
| 6,364,016 B1 | 4/2002 | Dalrymple et al. | |
| 6,380,137 B1 | 4/2002 | Heier et al. | |
| 6,439,309 B1 | 8/2002 | Matherly et al. | |
| 6,476,169 B1 | 11/2002 | Eoff et al. | |
| 6,476,283 B1 | 11/2002 | Devore et al. | |

| | | | |
|---|---|---|---|
| 6,497,283 B1 | 12/2002 | Eoff et al. | |
| 6,562,762 B2 | 5/2003 | Cowan et al. | |
| 6,569,983 B1 | 5/2003 | Treybig et al. | |
| 6,601,648 B2 | 8/2003 | Ebinger | |
| 6,607,035 B1 | 8/2003 | Reddy et al. | |
| 6,609,578 B2 | 8/2003 | Patel et al. | |
| 6,626,241 B2 | 9/2003 | Nguyen | |
| 6,627,719 B2 | 9/2003 | Whipple et al. | |
| 6,637,517 B2 | 10/2003 | Samuel et al. | |
| 6,656,885 B2 | 12/2003 | House et al. | |
| 6,662,874 B2 | 12/2003 | Surjaatmadja et al. | |
| 6,710,107 B2 | 3/2004 | Audibert et al. | |
| 6,743,288 B2 | 6/2004 | Eoff et al. | |
| 6,764,981 B1 | 7/2004 | Eoff et al. | |
| 6,767,867 B2 | 7/2004 | Chatterji et al. | |
| 6,767,869 B2 | 7/2004 | DiLullo et al. | |
| 6,780,822 B2 | 8/2004 | Cowan et al. | |
| 6,787,506 B2 | 9/2004 | Blair et al. | |
| 6,790,812 B2 | 9/2004 | Halliday et al. | |
| 6,803,348 B2 | 10/2004 | Jones et al. | |
| 6,846,420 B2 | 1/2005 | Reddy et al. | |
| 6,855,672 B2 | 2/2005 | Poelker et al. | |
| 6,884,760 B1 | 4/2005 | Brand et al. | |
| 6,962,203 B2 | 11/2005 | Funchess | |
| 6,978,836 B2 * | 12/2005 | Nguyen et al. | 166/295 |
| 6,981,552 B2 | 1/2006 | Reddy et al. | |
| 7,007,752 B2 | 3/2006 | Reddy et al. | |
| 7,008,908 B2 | 3/2006 | Chan et al. | |
| 7,036,587 B2 | 5/2006 | Munoz, Jr. et al. | |
| 7,036,589 B2 * | 5/2006 | Nguyen | 166/280.1 |
| 7,081,439 B2 | 7/2006 | Sullivan et al. | |
| 7,091,159 B2 | 8/2006 | Eoff et al. | |
| 7,114,568 B2 | 10/2006 | Eoff et al. | 166/291 |
| 7,117,942 B2 * | 10/2006 | Dalrymple et al. | 166/278 |
| 7,131,491 B2 | 11/2006 | Blauch et al. | 166/280.2 |
| 7,159,656 B2 | 1/2007 | Eoff et al. | |
| 7,182,136 B2 | 2/2007 | Dalrymple et al. | |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 7,273,099 B2 | 9/2007 | East, Jr. et al. | |
| 2003/0013871 A1 | 1/2003 | Mallon et al. | |
| 2003/0104948 A1 | 6/2003 | Poelker et al. | |
| 2003/0114317 A1 | 6/2003 | Benton et al. | |
| 2003/0191030 A1 | 10/2003 | Blair et al. | |
| 2004/0045712 A1 | 3/2004 | Eoff et al. | |
| 2004/0171495 A1 | 9/2004 | Zamora et al. | |
| 2004/0220058 A1 | 11/2004 | Eoff et al. | |
| 2004/0229756 A1 | 11/2004 | Eoff et al. | |
| 2004/0229757 A1 | 11/2004 | Eoff et al. | |
| 2005/0000694 A1 | 1/2005 | Dalrymple et al. | |
| 2005/0155796 A1 | 7/2005 | Eoff et al. | 175/72 |
| 2005/0164894 A1 | 7/2005 | Eoff et al. | 507/200 |
| 2005/0194140 A1 | 9/2005 | Dalrymple et al. | |
| 2005/0194142 A1 | 9/2005 | Nguyen et al. | 166/281 |
| 2005/0199396 A1 | 9/2005 | Sierra et al. | |
| 2005/0230114 A1 | 10/2005 | Eoff et al. | |
| 2005/0230116 A1 | 10/2005 | Eoff et al. | 165/305.1 |
| 2005/0277554 A1 | 12/2005 | Nguyen et al. | 507/224 |
| 2005/0284632 A1 | 12/2005 | Dalrymple et al. | |
| 2006/0124309 A1 | 6/2006 | Nguyen et al. | |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2006/0283592 A1 | 12/2006 | Sierra et al. | |
| 2007/0012445 A1 | 1/2007 | Nguyen et al. | |
| 2008/0110624 A1 | 5/2008 | Nguyen et al. | |

FOREIGN PATENT DOCUMENTS

| | | | |
|---|---|---|---|
| EP | 0 383 337 A2 | 8/1990 | |
| EP | 0 896 122 A2 | 2/1999 | |
| EP | 1 033 378 A1 | 9/2000 | |
| EP | 1 193 365 A1 | 4/2002 | |
| EP | 1 312 753 A1 | 5/2003 | |
| GB | 2 221 940 A | 2/1990 | |
| GB | 2 335 428 A | 9/1999 | |
| WO | WO 93/15164 | 8/1993 | |
| WO | WO 99/49183 | 9/1999 | |
| WO | WO 99/50530 | 10/1999 | |
| WO | WO 00/78890 | 12/2000 | |
| WO | WO 02/097236 A1 | 12/2002 | |
| WO | WO 03/056130 | 7/2003 | |
| WO | WO 2004/022667 A | 3/2004 | |
| WO | WO 2004/094781 | 11/2004 | |
| WO | WO 2004/101706 A1 | 11/2004 | |

OTHER PUBLICATIONS

Office action dated Nov. 5, 2007 from U.S. Appl. No. 11/545,136.
Office action dated Sep. 27, 2007 from U.S. Appl. No. 11/545,136.
Office action dated May 3, 2007 from U.S. Appl. No. 11/545,136.
Office action dated Dec. 15, 2006 from U.S. Appl. No. 11/545,136.
U.S Appl. No. 12/008,063, filed Jan. 8, 2008, Nguyen et al.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.
Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.
Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.
Halliburton, 2001 Press Releases, *Halliburton Technology Uses Revolutionary Polymer System to Control Unwanted Water Production*, 2002, Halliburton, pp. 1-2.
Halliburton, 2001 Press Releases, *First Halliburton H2Zero™ Conformance Solution Job Performed for a Producing Well in Egypt*, 2002 Halliburton, pp. 1-2.
Halliburton, 2001 Press Releases, *Halliburton Performs First H2Zero™ Conformance Solution Job in North America*, 2002 Halliburton, pp. 1-2.
BJ Services Company, *Aquacon, Product Information*, Aug. 1, 2001, pp. 1-2.
BJ Services Company, *Aquatrol I, Product Information*, Dec. 14, 2000, pp. 1-2.
Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000.
Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.
Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.
Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003.
Xu, et al., *Modeling of Laser Spallation Drilling of Rocks for Gas—and Oilwell Drilling*, SPE 95746, 2005, Society of Petroleum Engineers Inc., presented at the 2005 SPE Annual Technical Conference and Exhibition held in Dallas, Texas, Oct. 9-12, 2005.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003.

Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004.

Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005.

U.S. Appl. No. 12/080,647, filed Apr. 4, 2008.

Office Action dated May 30, 2008 from U.S. Appl. No. 12/008,063.

Office Action for U.S. Appl. No. 12/008,063 dated Nov. 14, 2008.

* cited by examiner

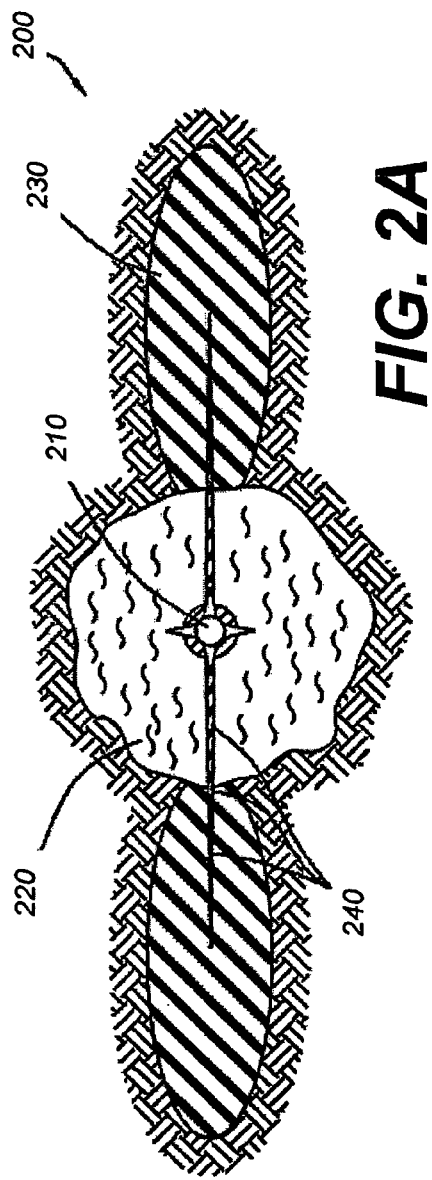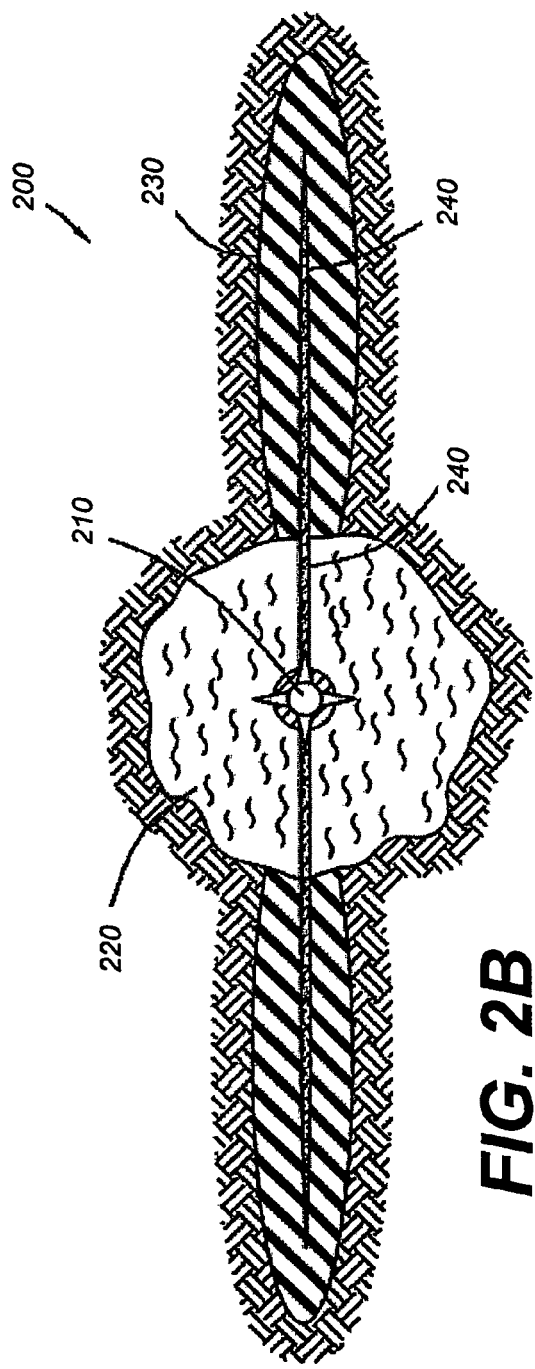

METHODS FOR CONTROLLING WATER AND SAND PRODUCTION IN SUBTERRANEAN WELLS

BACKGROUND

The present invention relates to the stabilization of subterranean formations. More particularly, the present invention relates to methods for stabilizing unconsolidated portions of a subterranean formation and controlling the production of water from those portions.

Hydrocarbon wells are often located in subterranean formations that contain unconsolidated particulates that may migrate out of the subterranean formation with the oil, gas, water, and/or other fluids produced by the wells. The presence of particulates, such as formation sand and even loose proppant, in produced fluids is undesirable in that the particulates may abrade pumping and other producing equipment and reduce the fluid production capabilities of the producing zones. Unconsolidated portions of a subterranean formation include those that contain loose particulates and those wherein the bonded particulates have insufficient bond strength to withstand the forces created by the production of fluids through the formation.

One method of controlling particulates in such unconsolidated portions has been to produce fluids from the formations at low flow rates, so that the near well stability of sand bridges and the like may be substantially preserved. The collapse of such sand bridges, however, may occur due to unintentionally high production rates and/or pressure cycling as may occur from repeated shut-ins and start ups of a well. The frequency of pressure cycling is critical to the longevity of the near well formation, especially during the depletion stage of the well when the pore pressure of the formation has already been significantly reduced.

Another method of controlling particulates in unconsolidated formations involves placing a filtration bed containing gravel near the well bore to present a physical barrier to the transport of unconsolidated formation fines with the production of hydrocarbons. Typically, such "gravel-packing operations" involve the pumping and placement of a quantity of a desired particulate into the unconsolidated formation in an area adjacent to a well bore. One common type of gravel-packing operation involves placing a gravel-pack screen in the well bore and packing the surrounding annulus between the screen and the well bore with gravel of a specific size designed to prevent the passage of formation sand. The gravel-pack screen is generally a filter assembly used to retain the gravel placed during the gravel-pack operation. A wide range of sizes and screen configurations are available to suit the characteristics of the gravel-pack sand used. Similarly, a wide range of sizes of gravel is available to suit the characteristics of the unconsolidated particulates in the subterranean formation. The resulting structure presents a barrier to migrating sand from the formation while still permitting fluid flow. When installing the gravel pack, the gravel is carried to the formation in the form of a slurry by mixing the gravel with a viscous treatment fluid. Once the gravel is placed in the well bore, the viscosity of the treatment fluid is reduced, and it is returned to the surface.

Gravel packs act, inter alia, to stabilize the formation while causing minimal impairment to well productivity. The gravel, inter alia, acts to prevent formation particulates from occluding the screen or migrating with the produced fluids, and the screen, inter alia, acts to prevent the gravel from entering the production tubing. Such packs may be time consuming and expensive to install. Due to the time and expense needed, it is sometimes desirable to place a screen without the gravel. Even in circumstances in which it is practical to place a screen without gravel, it is often difficult to determine an appropriate screen size to use as formation sands tend to have a wide distribution of grain sizes. When small quantities of sand are allowed to flow through a screen, formation erosion becomes a significant concern. As a result, the placement of gravel as well as the screen is often necessary to assure that the formation sands are controlled. Expandable sand screens have been developed and implemented in recent years. As part of the installation, an expandable sand screen may be expanded against the well bore, cased hole, or open hole for sand control purposes without the need for gravel packing. However, screen erosion and screen plugging are the main disadvantages of expandable screens.

Another method used to control particulates in unconsolidated formations involves consolidating unconsolidated subterranean producing zones into stable, permeable masses by applying a resin followed by a spacer fluid, a catalyst, and an after-flush fluid. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst an exothermic reaction occurs that may result in rapid polymerization, potentially damaging the formation by plugging pore channels, halting pumping when the well bore is plugged with solid material, or resulting in a downhole explosion as a result of the heat of polymerization. Also, using these conventional processes to treat long intervals of unconsolidated regions is not practical due to the difficulty in determining if the entire interval has been successfully treated with both the resin and the external catalyst. Further, conventional consolidation techniques have often resulted in limited or inadequate penetration distances of consolidating agent into formations.

Often, unconsolidated formation sands migrate out of the formation when water is produced from the formation. This migration of formation sands is due, in part, to the fact that most natural cementation between formation sand grains disintegrates when in contact with an aqueous moving phase. The production of water from a subterranean producing zone is disadvantageous due to its effect on mobilizing formation sands, and because water production constitutes a major expense in the recovery of hydrocarbons from subterranean formations, especially in light of the energy expended in producing, separating, and disposing of the water.

SUMMARY

The present invention relates to the stabilization of subterranean formations. More particularly, the present invention relates to methods for stabilizing unconsolidated portions of a subterranean formation and controlling the production of water from those portions.

One example of a method of stabilizing an unconsolidated subterranean formation that is penetrated by a well bore comprises providing a consolidating agent capable of consolidating an unconsolidated subterranean formation; introducing the consolidating agent into the subterranean formation so as to transform a portion of the subterranean formation surrounding the well bore into a consolidated region; and introducing a relative permeability modifier fluid into the subterranean formation so as to penetrate at least a portion of the consolidated region so as to modify the relative permeability of a portion of the consolidated region.

Another example of a method of stabilizing an unconsolidated subterranean formation that is penetrated by a well bore comprises providing a preflush fluid; treating a portion of the subterranean formation surrounding the well bore with the preflush fluid to form a treated portion of the subterranean formation; providing a consolidating agent capable of consolidating an unconsolidated subterranean formation; introducing the consolidating agent into the treated portion of the subterranean formation so as to transform a section of the treated portion of the subterranean formation into a consolidated region; and introducing a relative permeability modifier fluid into the subterranean formation at a rate and pressure sufficient to create or enhance at least one fracture in the consolidated region that extends into an unconsolidated portion that is adjacent to the consolidated region; and introducing a fracturing fluid into the fracture to form an extended fracture.

Yet another example of a method of stabilizing an unconsolidated subterranean formation that is penetrated by a well bore comprises providing a consolidating agent capable of consolidating an unconsolidated subterranean formation; introducing the consolidating agent into a portion of the subterranean formation surrounding the well bore so as to form a consolidated region in a portion of the subterranean formation; providing an after-fluid; introducing the after-flush fluid into the portion of the subterranean formation while the consolidating agent is in a flowable state; introducing a relative permeability modifier fluid into the subterranean formation so as to penetrate through the portion of the subterranean formation; and allowing the consolidating agent to set for a period of time sufficient to allow consolidation of the portion of the subterranean formation into a consolidated region.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention and should not be used to limit or define the invention.

FIG. 2A shows a cross-sectional view of a subterranean formation penetrated by a well bore after treatment with a consolidating agent, followed by treatment with a relative permeability modifier fluid which has been introduced at a rate and pressure sufficient to create or enhance at least one fracture in the subterranean formation.

FIG. 2B shows a cross-sectional view of the subterranean formation of FIG. 2A wherein a fracturing fluid comprising proppant particulates has been used to extend further the fracture into the formation.

DESCRIPTION OF PREFERRED EMBODIMENTS

Figure 1:
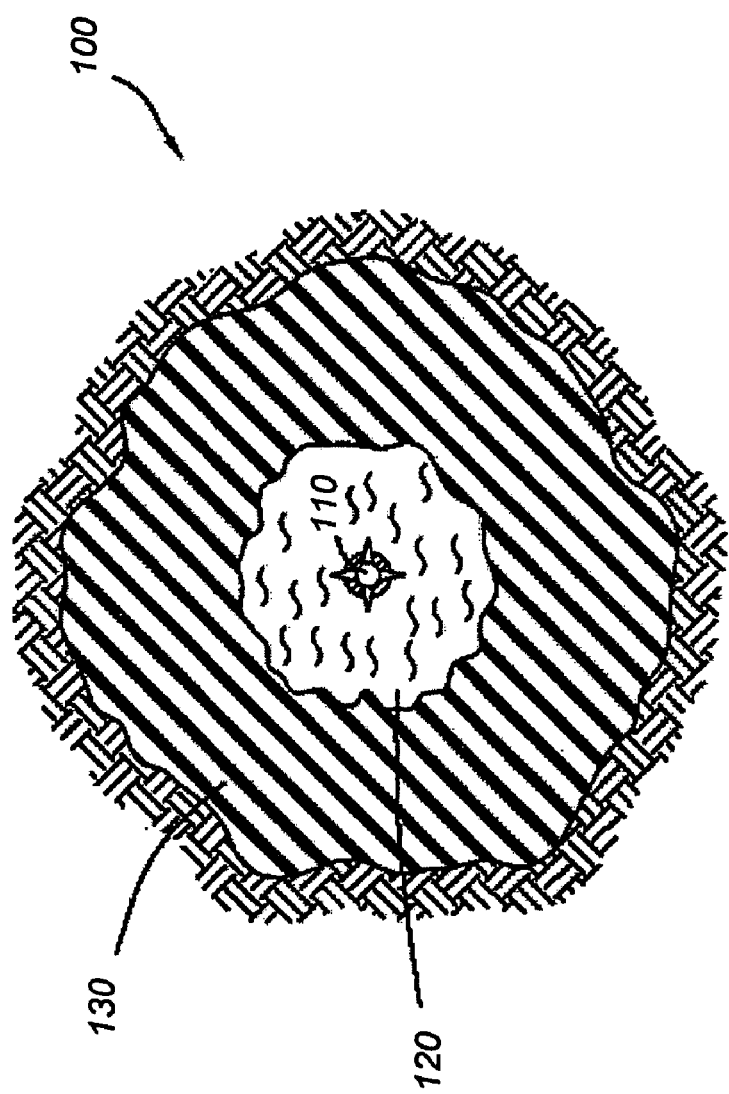
FIG. 1 shows a cross-sectional view of a subterranean formation penetrated by a well bore after treatment with a consolidating agent and a relative permeability modifier fluid, in which the consolidating agent has been introduced at a rate and pressure below the fracture pressure of the subterranean formation.

The present invention relates to the stabilization of subterranean formations. More particularly, the present invention relates to methods for stabilizing unconsolidated portions of a subterranean formation and controlling the production of water from those portions.

I. Methods of the Present Invention

One embodiment of the present invention describes a method of stabilizing an unconsolidated subterranean formation that is penetrated by a well bore comprising introducing a consolidating agent into the subterranean formation so as to transform a portion of the subterranean formation surrounding the well bore into a consolidated region; and introducing a relative permeability modifier fluid into the subterranean formation through the well bore so as to penetrate at least a portion of the consolidated region. The relative permeability modifier fluid, in some embodiments, may penetrate beyond the consolidated region.

The term, "unconsolidated subterranean formation," as used herein, refers to both unconsolidated and weakly consolidated formations. The term, "consolidating agent," as used herein, refers to any agent that may consolidate a portion of the subterranean formation, which may, at least in part, stabilize particulates such that loose or weakly consolidated particulates are prevented from shifting or migrating once the consolidation treatment is complete. The term, "relative permeability modifier fluid," as used herein refers to any fluid, which may, among other things, treat a portion of the subterranean formation so as to reduce the permeability of the treated portion to water without substantially reducing the formation permeability as to hydrocarbons.

Optionally, other embodiments may include the use of a preflush fluid and/or an after-flush fluid. Additional embodiments may include introducing a fracturing fluid to create or enhance fractures in the subterranean formation. The term, "create or enhance," as used herein also includes the action of extending previously created, or natural, fractures. Further, the well bore may be shut in for a period of time after introduction of the consolidating agent to allow for consolidation of the portion of the subterranean formation.

The term, "preflush fluid," as used herein refers to any fluid that may be suitable for preparing the subterranean formation for the later placement of the consolidating agent by, among other things, removing oil and/or debris from the pore spaces within the formation matrix of the unconsolidated portion. The term, "after-flush fluid," as used herein refers to any fluid that may, among other things, restore the permeability of the treated portion of the subterranean formation by displacing at least a portion of the consolidating agent from the pore channels of the subterranean formation and forcing the displaced portion of the consolidating agent further into the subterranean formation where it may have negligible impact on subsequent hydrocarbon production.

As an example of one embodiment of the methods of the present invention, FIG. 1 shows a cross-sectional view of subterranean formation 100 penetrated by well bore 110. First portion 120 of subterranean formation 100 has been treated with a consolidating agent to consolidate first portion 120 and form a consolidated region. Prior to the consolidation of first portion 120, an after-flush fluid may optionally be introduced into subterranean formation 100 to restore the permeability of first portion 120 after introduction of the consolidating agent. Further, after introduction of an after-flush fluid, well bore 110 may optionally be shut-in for a period of time to allow for consolidation of first portion 120. Second portion 130 of the subterranean formation 100 may be treated by a relative permeability modifier fluid introduced into subterranean formation through well bore 110 so as to penetrate first portion 120.

As another example of one embodiment of the methods of the present invention, FIG. 2A shows a cross-sectional view of subterranean formation 200 penetrated by well bore 210. First portion 220 of subterranean formation 200 has been treated with a consolidating agent to consolidate first portion 220 and form a consolidated region. A relative permeability modifier fluid has been introduced at a rate and pressure sufficient to create or enhance fracture 240 in subterranean formation 200. The relative permeability modifier fluid may flow into and treat second portion 230. Referring now to FIG. 2B, a fracturing fluid has been introduced at a rate and pressure sufficient to extend fracture 240 in subterranean formation 200. Fracture 240 may be packed with proppant to keep fracture 240 open. In this way, the relative permeability modifier fluid may treat regions that are beyond first portion 220 that have been consolidated using the consolidating agent and extend into second portion 230.

The treatment methods of the present invention may be performed in a variety of possible combinations and permutations depending upon the application and the type of treatment desired. As described above, methods of treating a portion of a subterranean formation may comprise introducing a consolidating agent into the subterranean formation so as to transform a portion of the subterranean formation surrounding the well bore into a consolidated region; and introducing a relative permeability modifier fluid into the subterranean formation so as to penetrate at least a portion of the consolidated region. Other optional steps that may be performed at or during various stages of the treatment process include the use of a preflush fluid and/or an after-flush fluid. Other embodiments may include introducing a fracturing fluid to create or enhance fractures in the consolidated region to an unconsolidated region of the subterranean formation.

The methods described herein may be performed repeatedly as desired. In those instances in which steps are repeated, it may be desirable, for example, to recommence the steps described herein starting first with the lowest zones of the formation and moving up to higher zones.

In certain embodiments of the present invention, an optional preflush fluid may be placed into the subterranean formation prior to the placement of the consolidating agent into the subterranean formation. The preflush fluid acts, inter alia, to prepare the subterranean formation for the later placement of the consolidating agent. Typically, injection of a preflush fluid may occur prior to consolidating a portion of a subterranean formation. Injecting a volume of a preflush fluid into an unconsolidated portion of a subterranean formation may, among other things, help to remove oil and/or debris from the pore spaces within the formation matrix of the unconsolidated portion. Generally, the volume of the preflush fluid placed into the formation is between 0.1 times to 50 times the volume of the consolidating agent. Preflush fluids suitable for use with the present invention are described in more detail below.

Introducing a volume of consolidating agent into the unconsolidated portion may among other things, transform a portion of the subterranean formation into a consolidated region. Consolidating the region surrounding the well bore may be advantageous in preventing well bore sloughing, formation sand production, and the migration of fines. Consolidating agents suitable for use in the present invention are described in more detail below.

In certain embodiments, the consolidation of a portion of a subterranean formation may result in diminishing the permeability of that portion. In certain embodiments, fracturing a portion of the formation may be required to reconnect the well bore with portions of the formation (e.g., the reservoir formation) outside the consolidated region, as discussed in more detail below. In other embodiments, typically when no fracturing step is used, an after-flush fluid may be used to restore permeability to the portion of the subterranean formation.

In certain embodiments of the present invention, after the placement of the consolidating agent into the subterranean formation, an optional after-flush fluid may be placed into the subterranean formation, inter alia, to restore the permeability of the treated portion of the subterranean formation. When used, the after-flush fluid is preferably placed into the subterranean formation while the consolidating agent is still in a flowing state. For example, an after-flush fluid may be placed into the formation prior to a shut-in period. Among other things, the after-flush fluid acts to displace at least a portion of the consolidating agent from the pore channels of the subterranean formation and to force the displaced portion of the consolidating agent further into the subterranean formation where it may have negligible impact on subsequent hydrocarbon production. Generally, the after-flush fluid may be any fluid that does not adversely react with the other components used in accordance with this invention or with the subterranean formation. For example, the after-flush may be an aqueous-based brine, a hydrocarbon fluid (such as kerosene, diesel, or crude oil), or a gas (such as nitrogen or carbon dioxide). The after-flush fluid may be placed into the formation at a matrix flow rate such that a sufficient portion of the consolidating agent may be displaced from the pore channels to restore the formation to a desired permeability. Generally, a substantial amount of the consolidating agent, however, should not be displaced therein. For example, sufficient amounts of the consolidating agent should remain in the treated portion to provide effective stabilization of the unconsolidated portions of the subterranean formation therein.

Generally, the volume of after-flush fluid placed in the subterranean formation ranges from about 0.1 times to about 50 times the volume of the consolidating agent. In some embodiments of the present invention, the volume of after-flush fluid placed in the subterranean formation ranges from about 0.1 times to about 5 times the volume of the consolidating agent.

In another embodiment of the present invention, no after-flush fluid is placed into the subterranean formation after placement of a consolidating agent into the subterranean formation. Where no after-flush fluid is used, the permeability of the subterranean formation may be significantly reduced, because the consolidating agent may remain in the pore spaces therein and may convert into a consolidated substance. While a significant reduction in the permeability may occur, the unconsolidated portions of the formation may be stabilized due, inter alia, to the consolidating agent remaining in the pore spaces of the formation. In embodiments in which no after-flush fluid is used, a portion of the formation may be fractured so as to reconnect the well bore with portions of the formation outside the consolidated region.

According to the methods of the present invention, after placement of the consolidating agent, the subterranean formation may be shut in for a period of time to allow the consolidating agent to transform a portion of the subterranean formation into a consolidated region. The shutting-in of the well bore for a period of time may, inter alia, stabilize unconsolidated portions of the subterranean formation, for example, by enhancing the coating and curing of the resin between formation particulates and minimizing the washing away of the consolidating agent during later placement of a relative permeability modifier.

Typically, the shut-in period of the well bore occurs after placement of the consolidating agent. In embodiments using an after-flush fluid, the shut-in period preferably occurs after the use of the after-flush fluid. In embodiments in which a fracturing step is used, preferably, no shut-in period is used.

The necessary shut-in time period is dependent, among other things, on the composition of the consolidating agent used and the temperature of the formation. Generally, the chosen period of time will be between about 0.5 hours and about 72 hours or longer. Determining the proper period of time to shut in the formation is within the ability of one skilled in the art with the benefit of this disclosure.

Generally, the relative permeability modifier fluid should reduce the permeability of the treated portion to water without substantially reducing the hydrocarbon permeability. Among other things, the relative permeability modifier fluid also may displace excess portions of the consolidating agent into the formation and restore the initial permeability to hydrocarbons of the treated portion. Relative permeability modifier fluids may be introduced into the subterranean formation through the well bore so as to penetrate the consolidated region. For example, the relative permeability modifier fluids may penetrate through the consolidated region and into portion of the subterranean formation (e.g., unconsolidated portions) that are adjacent to the consolidated region. In certain embodiments, the relative permeability modifier fluids are introduced into the subterranean formation after the after-flush fluid has restored the permeability of the consolidated region. In certain embodiments, the relative permeability modifier fluids are introduced into the subterranean formation at a rate and pressure sufficient to create or enhance at least one fracture in a portion of the subterranean formation. In certain embodiments, this fracture or fractures may extend from a consolidated region of the subterranean formation to an unconsolidated portion of the subterranean formation. The relative permeability modifier fluid may leak off into the unconsolidated portion of the formation along the fracture. In this way, the relative permeability modifier fluid may treat regions of the formation beyond the consolidated region of the formation. In certain embodiments, an after-flush fluid, as described above, may be introduced into the subterranean formation so as displace at least a portion of the relative permeability fluid further into the formation. Relative permeability modifier fluids suitable for use in the present invention are described in more detail below.

In those embodiments in which a fracture is initiated through the use of a relative permeability modifier fluid, the fracture may be extended and packed using any suitable fracturing methodology known to one skilled in the art with the benefit of this disclosure. For example, a fracture may be extended using a crosslinked gelled fracturing fluid to further extend the fracture into the formation followed by a crosslinked gelled fluid containing proppant, or a viscoelastic surfactant fluid containing proppant. The proppant may be coated with a curable resin or consolidating agent to form a hard, permeable solid mass in the fracture or fractures, among other things, to prevent proppant flow back during production from the well. The proppant also may be blended with fibrous particulates to form a stable network with the proppant and also partially control proppant flow back.

II. Fluids Useful in the Methods of the Present Invention

A. Exemplary Preflush Fluids

Preflush fluids suitable for use with the present invention may comprise a brine, a mutual solvent, a surfactant, or any mixture thereof.

The preflush fluid of the present invention may include any fluid that does not adversely interact with the other components used in accordance with this invention or with the subterranean formation. For example, the preflush fluid may be an aqueous-based fluid or a hydrocarbon-based fluid. In certain embodiments of the present invention, the preflush fluid may comprise an aqueous fluid and a surfactant. The aqueous-fluid component may be fresh water, salt water, brine, or seawater, or any other aqueous-based fluid that does not adversely react with the other components used in accordance with this invention or with the subterranean formation. Any surfactant compatible with the later-used consolidating agent and capable of aiding the consolidating agent in flowing to the contact points between adjacent particulates in the formation may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773, the relevant disclosure of which is incorporated herein by reference. A $C_{12}$-$C_{22}$ alkyl phosphonate surfactant is preferred. The surfactant or surfactants used are included in the preflush fluid in an amount sufficient to prepare the subterranean formation to receive a treatment of a consolidating agent. In some embodiments of the present invention, the surfactant is present in the preflush fluid in an amount in the range of from about 0.1% to about 3% by weight of the aqueous fluid.

B. Exemplary Consolidating Agents

Suitable consolidating agents include any suitable composition for consolidating a portion of the subterranean formation to stabilize unconsolidated particulates therein. Examples of suitable consolidating agents include resins, tackifying agents, and gelable liquid compositions.

1. Exemplary Resins

Resins suitable for use in the consolidation fluids of the present invention include any suitable resin that is capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.) but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

2. Exemplary Tackifying Agents

Tackifying agents suitable for use in the methods of the present invention exhibit a sticky character and, thus, impart a degree of consolidation to unconsolidated particulates in the subterranean formation. As used herein, a "tackifying agent" refers to a composition having a nature such that it is (or may be activated to become) somewhat sticky to the touch. Examples of suitable tackifying agents suitable for use in the present invention include non-aqueous tackifying agents; aqueous tackifying agents; and silyl-modified polyamides.

One type of tackifying agent suitable for use in the present invention is a non-aqueous tackifying agent. An example of a suitable tackifying agent may comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000, the relevant disclosures of which are herein incorporated by reference.

Non-aqueous tackifying agents suitable for use in the present invention may be either used such that they form non-hardening coating, or they may be combined with a multifunctional material capable of reacting with the non-aqueous tackifying agent to form a hardened coating. A "hardened coating," as used herein, means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510, the relevant disclosure of which is herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifier agents suitable for use in the present invention are not significantly tacky when placed onto a particulate, but are capable of being "activated" (that is, destabilized, coalesced, and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifier agent may enhance the grain-to-grain contact between the individual particulates within the formation (be they proppant particulates, formation fines, or other particulates), helping bring about the consolidation of the particulates into a cohesive, flexible, and permeable mass.

Examples of aqueous tackifier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Methods of determining suitable aqueous tackifier agents and additional disclosure on aqueous tackifier agents can be found in U.S. patent application Ser. No. 10/864,061, filed Jun. 9, 2004, and U.S. patent application Ser. No. 10/864,618, filed Jun. 9, 2004, the relevant disclosures of which are hereby incorporated by reference.

Silyl-modified polyamide compounds suitable for use in the tackifying agents in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the relevant disclosure of which is herein incorporated by reference.

3. Exemplary Gelable Liquid Compositions

The gelable liquid composition may be any gelable liquid composition capable of converting into a gelled substance capable of substantially plugging the permeability of the formation while allowing the formation to remain flexible. That is, the gelled substance should negatively impact the ability of the formation to produce desirable fluids such as hydrocarbons. As discussed above, the permeability of the formation may be restored through use of an after-flush fluid or by fracturing through the consolidated region. As referred to herein, the term "flexible" refers to a state wherein the treated formation is relatively malleable and elastic and able to withstand substantial pressure cycling without substantial breakdown of the formation. Thus, the resultant gelled substance should be a semi-solid, immovable, gel-like substance, which, among other things, stabilizes the treated portion of the formation while allowing the formation to absorb the stresses created during pressure cycling. As a result, the gelled substance may aid in preventing breakdown of the formation both by stabilizing and by adding flexibility to the formation sands. Examples of suitable gelable liquid compositions include, but are not limited to, resin compositions that cure to form flexible gels, gelable aqueous silicate compositions, crosslinkable aqueous polymer compositions, and polymerizable organic monomer compositions.

Certain embodiments of the gelable liquid compositions of the present invention comprise curable resin compositions. Curable resin compositions are well known to those skilled in the art and have been used to consolidate portions of unconsolidated formations and to consolidate proppant materials into hard, permeable masses. While the curable resin compositions used in accordance with the present invention may be similar to those previously used to consolidate sand and proppant into hard, permeable masses, they are distinct in that resins suitable for use with the present invention do not cure into hard, permeable masses; rather they cure into flexible, gelled substances. That is, suitable curable resin compositions form resilient gelled substances between the particulates of the treated zone of the unconsolidated formation and thus allow that portion of the formation to remain flexible and to resist breakdown. It is not necessary or desirable for the cured resin composition to solidify and harden to provide high consolidation strength to the treated portion of the formation. On the contrary, upon being cured, the curable resin compositions useful in accordance with this invention form semi-solid, immovable, gelled substances.

Generally, the curable resin compositions useful in accordance with this invention may comprise a curable resin, a diluent, and a resin curing agent. When certain resin curing agents, such as polyamides, are used in the curable resin compositions, the compositions form the semi-solid, immovable, gelled substances described above. Where the resin curing agent used may cause the organic resin compositions to form hard, brittle material rather than a desired gelled substance, the curable resin compositions may further comprise one or more "flexibilizer additives" (described in more detail below) to provide flexibility to the cured compositions.

Examples of curable resins that can be used in the curable resin compositions of the present invention include, but are not limited to, organic resins such as polyepoxide resins (e.g., bisphenol A-epichlorihydrin resins), polyester resins, urea-aldehyde resins, furan resins, urethane resins, and mixtures thereof. Of these, polyepoxide resins are preferred.

Any diluent that is compatible with the curable resin and achieves the desired viscosity effect is suitable for use in the present invention. Examples of diluents that may be used in the curable resin compositions of the present invention include, but are not limited to, phenols; formaldehydes; furfuryl alcohols; furfurals; alcohols; ethers such as butyl glycidyl ether and cresyl glycidyl etherphenyl glycidyl ether; and mixtures thereof. In some embodiments of the present invention, the diluent comprises butyl lactate. The diluent may be used to reduce the viscosity of the curable resin composition to from about 3 to about 3,000 centipoises ("cP") at 80° F. Among other things, the diluent acts to provide flexibility to the cured composition. The diluent may be included in the curable resin composition in an amount sufficient to provide the desired viscosity effect. Generally, the diluent used is included in the curable resin composition in amount in the range of from about 5% to about 75% by weight of the curable resin.

Generally, any resin curing agent that may be used to cure an organic resin is suitable for use in the present invention. When the resin curing agent chosen is an amide or a polyamide, generally no flexibilizer additive will be required because, inter alia, such curing agents cause the curable resin composition to convert into a semi-solid, immovable, gelled substance. Other suitable resin curing agents (such as an amine, a polyanine, methylene dianiline, and other curing agents known in the art) will tend to cure into a hard, brittle material and will thus benefit from the addition of a flexibilizer additive. Generally, the resin curing agent used is included in the curable resin composition, whether a flexibilizer additive is included or not, in an amount in the range of from about 5% to about 75% by weight of the curable resin. In some embodiments of the present invention, the resin curing agent used is included in the curable resin composition in an amount in the range of from about 20% to about 75% by weight of the curable resin.

As noted above, flexibilizer additives may be used, inter alia, to provide flexibility to the gelled substances formed from the curable resin compositions. Flexibilizer additives should be used where the resin curing agent chosen would cause the organic resin composition to cure into a hard and brittle material—not the desired gelled substances described herein. For example, flexibilizer additives may be used where the resin curing agent chosen is not an amide or polyamide. Examples of suitable flexibilizer additives include, but are not limited to, an organic ester, an oxygenated organic solvent, an aromatic solvent, and combinations thereof. Of these, ethers, such as dibutyl phthalate, are preferred. Where used, the flexibilizer additive may be included in the curable resin composition in an amount in the range of from about 5% to about 80% by weight of the curable resin. In some embodiments of the present invention, the flexibilizer additive may be included in the curable resin composition in an amount in the range of from about 20% to about 45% by weight of the curable resin.

In other embodiments, the gelable liquid compositions of the present invention may comprise a gelable aqueous silicate composition. Generally, the gelable aqueous silicate compositions that are useful in accordance with the present invention generally comprise an aqueous alkali metal silicate solution and a temperature activated catalyst for gelling the aqueous alkali metal silicate solution.

The aqueous alkali metal silicate solution component of the gelable aqueous silicate compositions generally comprises an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a $Na_2O$-to-$SiO_2$ weight ratio in the range of from about 1:2 to about 1:4. Most preferably, the sodium silicate used has a $Na_2O$-to-$SiO_2$ weight ratio in the range of about 1:3.2. Generally, the alkali metal silicate is present in the aqueous alkali metal silicate solution component in an amount in the range of from about 0.1% to about 10% by weight of the aqueous alkali metal silicate solution component.

The temperature activated catalyst component of the gelable aqueous silicate compositions is used, inter alia, to convert the gelable aqueous silicate compositions into the desired semi-solid, immovable, gelled substance described above. Selection of a temperature activated catalyst is related, at least in part, to the temperature of the subterranean formation to which the gelable aqueous silicate composition will be introduced. The temperature activated catalysts which can be used in the gelable aqueous silicate compositions of the present invention include, but are not limited to, ammonium sulfate, which is most suitable in the range of from about 60° F. to about 240° F.; sodium acid pyrophosphate, which is most suitable in the range of from about 60° F. to about 240° F.; citric acid, which is most suitable in the range of from about 60° F. to about 120° F.; and ethyl acetate, which is most suitable in the range of from about 60° F. to about 120° F. Generally, the temperature activated catalyst is present in the gelable aqueous silicate composition in the range of from about 0.1% to about 5% by weight of the gelable aqueous silicate composition.

In other embodiments, the gelable liquid compositions of the present invention may comprise crosslinkable aqueous polymer compositions. Generally, suitable crosslinkable aqueous polymer compositions may comprise an aqueous solvent, a crosslinkable polymer, and a crosslinking agent.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some embodiments of the present invention, the crosslinkable polymer is included in the crosslinkable aqueous polymer composition in an amount in the range of from about 1% to about 30% by weight of the aqueous solvent. In another embodiment of the present invention, the crosslinkable polymer is included in the crosslinkable aqueous polymer composition in an amount in the range of from about 1% to about 20% by weight of the aqueous solvent.

The crosslinkable aqueous polymer compositions of the present invention may further comprise a crosslinking agent for crosslinking the crosslinkable polymers to form the desired gelled substance. In some embodiments, the crosslinking agent may be a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of the present invention in an amount sufficient to provide, inter alia, the desired degree of crosslinking. In some embodiments of the present invention, the crosslinking agent is present in the crosslinkable aqueous polymer compositions of the present invention in an amount in the range of from 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agents derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

In other embodiments, the gelled liquid compositions of the present invention may comprise polymerizable organic monomer compositions. Generally, suitable polymerizable organic monomer compositions may comprise an aqueous-base fluid, a water-soluble polymerizable organic monomer, an oxygen scavenger, and a primary initiator.

The aqueous-base fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinyl-phosphonic acid, and methacryloyloxyethyl trimethylammonium sulfate, and mixtures thereof. Preferably, the water-soluble polymerizable organic monomer should be self crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene gylcol acrylate, polypropylene glycol methacrylate, and mixtures thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer(s) are included in the polymerizable organic monomer composition in an amount in the range of from about 1% to about 30% by weight of the aqueous-base fluid. In another embodiment of the present invention, the water-soluble polymerizable organic monomer(s) are included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

The primary initiator is used, inter alia, to initiate polymerization of the water-soluble polymerizable organic monomer(s) used in the present invention. Any compound or compounds which form free radicals in aqueous solution may be used as the primary initiator. The free radicals act, inter alia, to initiate polymerization of the water-soluble polymerizable organic monomer(s) present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Preferred azo polymerization initiators include 2,2'-azobis(2-imidazole-2-hydroxyethyl)propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain embodiments of the present invention, the primary initiator is present in the polymerizable organic monomer composition in an amount in the range of from about 0.1% to about 5% by weight of the water-soluble polymerizable organic monomer(s).

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Optionally, the polymerizable organic monomer compositions of the present invention further may comprise a crosslinking agent for crosslinking the polymerizable organic monomer compositions in the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

C. Relative Permeability Modifier Fluids

The relative permeability modifier fluids of the present invention may comprise an aqueous fluid and a relative permeability modifier. As used herein, "relative permeability modifier" refers to any material capable of reducing the permeability of a subterranean formation to aqueous fluids without substantially reducing the permeability of the subterranean formation to hydrocarbons. A variety of additional additives suitable for use in subterranean operations also may be included in the relative permeability modifier fluids as desired. The aqueous fluid of the relative permeability modifier fluids of the present invention may include freshwater, saltwater, brine (e.g., saturated or unsaturated saltwater), or seawater. Generally, the aqueous fluid may be from any source, provided that it does not contain components that may adversely affect other components in the treatment fluid.

The relative permeability modifiers useful in the present invention may be any relative permeability modifier that is suitable for use in subterranean operations. After introducing the relative permeability modifier fluid into a portion of the subterranean formation, the relative permeability modifier should attach to surfaces within the porosity of the subterranean formation, so as to reduce the permeability of the portion of the subterranean formation to aqueous fluids without substantially changing its permeability to hydrocarbons. Examples of suitable relative permeability modifiers include water-soluble polymers with or without hydrophobic or hydrophilic modification. As used herein, "water-soluble" refers to at least 0.01 weight percent soluble in distilled water. A water-soluble polymer with hydrophobic modification is referred to herein as a "hydrophobically modified polymer." As used herein, the term "hydrophobic modification," or "hydrophobically modified," refers to the incorporation into the hydrophilic polymer structure of hydrophobic groups, wherein the alkyl chain length is from about 4 to about 22 carbons. A water-soluble polymer with hydrophilic modification is referred to herein as a "hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer. Combinations of hydrophobically modified polymers, hydrophilically modified polymers, and water-soluble polymers without hydrophobic or hydrophilic modification may be included in the relative modifier fluids of the present invention.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized using any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming hydrophobically modified polymers of the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly (methacrylic acid/dimethylaminoethyl methacrylate), poly (2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly (methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically-modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction is an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may be a dimethylaminoethyl methacrylate/hexadecyl-dimethylammoniumethyl methacrylate bromide copolymer.

In another embodiment of the present invention, the relative permeability modifier fluid of the present invention may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of a suitable relative permeability modifier may be present in the treatment fluids of the present invention to provide the desired degree of diversion. The amount of the relative permeability modifier to include in the treatment fluid depends on a number of factors including, the composition of the fluid to be diverted and the porosity of the formation. In some embodiments, a relative permeability modifier may be present in a treatment fluid of the present invention in an amount in the range of from about 0.02% to about 10% by weight of the composition. In some embodiments, a relative permeability modifier may be present in an amount in the range of from about 0.05% to about 1.0% by weight of the composition. In certain embodiments of the present invention, the relative permeability modifier may be provided in a concentrated aqueous solution prior to its combination with the other components necessary to form a treatment fluid of the present invention.

In another embodiment of the present invention, the water-soluble relative permeability modifiers comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid.

Additional additives may be included in the treatment fluids of the present invention as deemed appropriate for a particular application by one skilled in the art, with the benefit of this disclosure. Examples of such additives include, but are not limited to, acids, weighting agents, surfactants, scale inhibitors, antifoaming agents, bactericides, salts, foaming agents, fluid loss control additives, viscosifying agents, gel breakers, clay stabilizers, and combinations thereof.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of stabilizing an unconsolidated subterranean formation that is penetrated by a well bore, comprising:
   providing a consolidating agent capable of consolidating the unconsolidated subterranean formation;
   introducing the consolidating agent into the unconsolidated subterranean formation so as to transform a portion of the subterranean formation surrounding the well bore into a consolidated region; and
   introducing an after-flush fluid into the unconsolidated subterranean formation after the consolidating agent; and
   introducing a relative permeability modifier fluid into the unconsolidated subterranean formation after introduction of the after-flush fluid so as to penetrate at least the consolidated region.

2. The method of claim 1 further comprising:
   treating the portion of the unconsolidated subterranean formation with a preflush fluid.

3. The method of claim 1 further comprising:
   allowing the consolidating agent to set.

4. The method of claim 3 wherein allowing the consolidating agent to set occurs before the introducing the relative permeability modifier fluid.

5. The method of claim 1 wherein introducing a relative permeability modifier fluid into the unconsolidated subterranean formation comprises introducing the relative permeability modifier fluid into the consolidated region so as to create or enhance at least one fracture that extends beyond the consolidated region.

6. The method of claim 5 further comprising:
   introducing a fracturing fluid into the fracture to extend the fracture to create an extended fracture.

7. The method of claim 1 wherein the after-flush fluid is introduced into the unconsolidated subterranean formation while the consolidating agent is in a flowable state.

8. The method of claim 1 wherein the consolidating agent comprises at least one of the following: a resin; a tackifying agent; or a gelable liquid composition.

9. The method of claim 1 wherein the relative permeability modifier fluid comprises at least one of the following: a water-soluble, hydrophobically modified polymer; a water-soluble, hydrophilically modified polymer; or a water-soluble polymer without hydrophobic or hydrophilic modification.

10. The method of claim 1 wherein the relative permeability modifier fluid comprises an amino methacrylate/alkyl amino methacrylate copolymer.

11. A method of stabilizing an unconsolidated subterranean formation that is penetrated by a well bore, comprising:

providing a preflush fluid;
treating a portion of the unconsolidated subterranean formation surrounding the well bore with the preflush fluid to form a treated portion of the unconsolidated subterranean formation;
providing a consolidating agent capable of consolidating the unconsolidated subterranean formation;
introducing the consolidating agent into the treated portion of the unconsolidated subterranean formation so as to transform a section of the treated portion of the unconsolidated subterranean formation into a consolidated region; and
introducing a relative permeability modifier fluid into the unconsolidated subterranean formation so as to create or enhance at least one fracture in the consolidated region that extends beyond the consolidated region; and
introducing a fracturing fluid into the fracture to form an extended fracture.

12. The method of claim 11 further comprising allowing the consolidating agent to set.

13. The method of claim 11 wherein the consolidating agent comprises at least one of the following: a resin; a tackifying agent; or a gelable liquid composition.

14. The method of claim 11 wherein the relative permeability modifier fluid comprises at least one of the following: a water-soluble, hydrophobically modified polymer; a water-soluble, hydrophilically modified polymer; or a water-soluble polymer without hydrophobic or hydrophilic modification.

15. The method of claim 11 wherein the relative permeability modifier fluid comprises an amino methacrylate/alkyl amino methacrylate copolymer.

16. A method of stabilizing an unconsolidated subterranean formation that is penetrated by a well bore comprising:
providing a consolidating agent capable of consolidating the unconsolidated subterranean formation;
introducing the consolidating agent into a portion of the unconsolidated subterranean formation-surrounding the well bore so as to form a consolidated region;
providing an after-flush fluid;
introducing the after-flush fluid into the portion of the subterranean formation after introduction of the consolidating agent and while the consolidating agent is in a flowable state;
introducing a relative permeability modifier fluid into the unconsolidated subterranean formation after introduction of the after-fluid fluid so as to penetrate through the portion of the unconsolidated subterranean formation; and
allowing the consolidating agent to set.

17. The method of claim 16 wherein the consolidating agent comprises at least one of the following: a resin; a tackifying agent; or a gelable liquid composition.

18. The method of claim 16 wherein the relative permeability modifier fluid comprises at least one of the following: a water-soluble, hydrophobically modified polymer; a water-soluble, hydrophilically modified polymer; or a water-soluble polymer without hydrophobic or hydrophilic modification.

19. The method of claim 16 wherein the relative permeability modifier fluid comprises an amino methacrylate/alkyl amino methacrylate copolymer.

* * * * *